US009311380B2

(12) United States Patent
Chawda et al.

(10) Patent No.: US 9,311,380 B2
(45) Date of Patent: Apr. 12, 2016

(54) PROCESSING SPATIAL JOINS USING A MAPREDUCE FRAMEWORK

(71) Applicant: International Business Machines Corporation, Armonk, NY (US)

(72) Inventors: Bhupesh S. Chawda, New Delhi (IN); Himanshu Gupta, New Delhi (IN); Tanveer A Faruquie, White Plains, NY (US); L. Venkata Subramaniam, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/853,451

(22) Filed: Mar. 29, 2013

(65) Prior Publication Data

US 2014/0297585 A1    Oct. 2, 2014

(51) Int. Cl.
    *G06F 17/30*    (2006.01)

(52) U.S. Cl.
    CPC .... *G06F 17/30584* (2013.01); *G06F 17/30545* (2013.01)

(58) Field of Classification Search
    USPC .......................... 707/737, 610, 639, 743, 741
    See application file for complete search history.

(56) References Cited

U.S. PATENT DOCUMENTS

| | | | |
|---|---|---|---|
| 6,882,997 B1 * | 4/2005 | Zhang et al. .................. 707/737 |
| 7,167,856 B2 * | 1/2007 | Lawder | |
| 7,512,600 B2 | 3/2009 | Al-Omari et al. | |
| 7,966,340 B2 | 6/2011 | Friedman et al. | |
| 8,190,610 B2 | 5/2012 | Dasdan et al. | |
| 8,819,078 B2 * | 8/2014 | Roy et al. ....................... 707/802 |
| 2004/0111410 A1 * | 6/2004 | Burgoon et al. .................. 707/4 |
| 2009/0187587 A1 * | 7/2009 | Chatterjee et al. ............ 707/102 |
| 2009/0282122 A1 * | 11/2009 | Patel et al. .................... 709/207 |
| 2011/0047172 A1 | 2/2011 | Chen et al. | |
| 2011/0066649 A1 * | 3/2011 | Berlyant et al. ............... 707/770 |
| 2011/0161281 A1 * | 6/2011 | Sayyaparaju et al. ........ 707/607 |
| 2011/0161352 A1 * | 6/2011 | de Castro Alves et al. ... 707/769 |
| 2012/0109888 A1 * | 5/2012 | Zhang et al. .................. 707/610 |
| 2012/0166446 A1 * | 6/2012 | Bowman ........... G06F 17/30327 707/743 |
| 2012/0246146 A1 | 9/2012 | Lee | |
| 2012/0278323 A1 | 11/2012 | Chattopadhyay et al. | |
| 2012/0284280 A1 * | 11/2012 | Kumar .......................... 707/743 |
| 2013/0325856 A1 * | 12/2013 | Soto Matamala et al. .... 707/724 |
| 2013/0325903 A1 * | 12/2013 | Rohlf et al. ................... 707/797 |
| 2014/0052711 A1 * | 2/2014 | Bamba et al. ................. 707/718 |

(Continued)

OTHER PUBLICATIONS

Zhang et al., High-Performance Spatial Join Processing on gpgpus with Applications to Large-Scale Taxi Trip Data, Technical Report, 2012.

(Continued)

*Primary Examiner* — Mariela Reyes
*Assistant Examiner* — Thong Vu
(74) *Attorney, Agent, or Firm* — Ryan, Mason & Lewis, LLP (57) ABSTRACT

Techniques, systems, and articles of manufacture for processing spatial joins using a MapReduce framework. A method includes partitioning a spatial data domain based on a distribution of spatial data objects across multiple nodes of a cluster of machines, defining at least one operation to be performed on the partitioned spatial data domain based on one or more predicates of a query, and executing the at least one defined operation on the partitioned spatial data domain to determine a response to the query.

12 Claims, 4 Drawing Sheets

(56) References Cited

U.S. PATENT DOCUMENTS

2014/0279871 A1* 9/2014 Ochoa et al. .......... 707/610
2014/0310243 A1* 10/2014 McGee et al. .......... 707/639

OTHER PUBLICATIONS

Zhong et al., Towards Parallel Spatial Query Processing for Big Spatial Data, 2011.
X. Zhang et al., Efficient Multi-Way Theta-Join Processing Using Mapreduce, Aug. 27-31, 2012, Istanbul, Turkey. Proceedings of the VLDB Endowment, vol. 5, No. 11.
Chandar, Join Algorithms Using Map/Reduce. School of Informatics, University of Edinburgh, 2010.
Herodotou et al., Join Optimization Techniques for Partitioned Tables. VLDB'10 Sep. 13-17, 2010.
Mamoulis et al., Multiway Spatial Joins, ACM Transactions on Database Systems (TODS), vol. 26 Issue 4, pp. 424-475, Dec. 2001.
Papadias et al., Approximate Processing of Multiway Spatial Joins in Very Large Databases, EDBT 2002.
Zhu et al. On Multi-Way Spatial Joins with Direction Predicates, SSTD 2001.
Afrati et al. Optimizing Joins in a Map-Reduce Platform, EDBT Mar. 2010.
Okcan et al., Processing Theta Joins Using Mapreduce, SIGMOD 2011.
Wang et al., Accelerating Spatial Data Processing on Map-Reduce, ICPADS 2010.
C. Zhang et al., Efficient Parallel kNN Joins for Large Data in Mapreduce, EDBT 2012.
S. Zhang et al., Parallelizing Spatial Joins with Mapreduce on Clusters, Cluster, 2009.

* cited by examiner

PROCESSING SPATIAL JOINS USING A MAPREDUCE FRAMEWORK

FIELD OF THE INVENTION

Embodiments of the invention generally relate to information technology, and, more particularly, to data processing techniques.

BACKGROUND

Spatial data characterize information that is intended to represent various objects in a database. Simple objects can include points, lines, circles, squares, rectangles, etc., while complex objects can be composed, for example, from multiple simple objects. Additionally, spatial data can be derived from multiple applications such as maps, location-based services, trajectories, distributed grids, navigation information, asset exploration, distribution of resources, planning, transportation information, sensors, etc. Further, spatial data can be derived from multiple sources such as, for example, global positioning system (GPS) data, geo-tagged web data, and sensor streams.

Processing spatial data is increasingly challenging as the amount of such data continues to grow. Existing processing approaches attempt to handle spatial joins within databases or attempt to handle two-way spatial joins on MapReduce. However, a need exists for processing multi-way spatial joins on MapReduce.

SUMMARY

In one aspect of the present invention, techniques for processing spatial joins using a MapReduce framework are provided. An exemplary computer-implemented method can include steps of partitioning a spatial data domain based on a distribution of spatial data objects across multiple nodes of a cluster of machines, defining at least one operation to be performed on the partitioned spatial data domain based on one or more predicates of a query, and executing the at least one defined operation on the partitioned spatial data domain to determine a response to the query.

In another aspect of the invention, an exemplary computer-implemented method can include steps of partitioning a spatial data domain based on a distribution of spatial data objects across multiple nodes of a cluster of machines, implementing a bounding (for example, a rectangle) around each spatial data object in the partitioned spatial data domain, processing one or more predicates of a query against each bounding in the partitioned spatial data domain to one or more of the one or more predicates that are applicable to the spatial data objects, defining at least one operation to be performed on the partitioned spatial data domain based on the one or more predicates of the query, and executing the at least one defined operation on the partitioned spatial data domain to determine a response to the query.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes processing spatial joins efficiently using a MapReduce framework. At least one embodiment of the invention includes techniques for computing spatial and hybrid joins on data distributed over multiple nodes. Specifically, an aspect of the invention includes defining a distribution of spatial objects across multiple reducers (that is, across multiple partitions) so as to minimize the cost of processing the query.

By way of illustration, consider the following example in connection with processing spatial joins. An example query (Q) might include a request to locate all establishments within seven kilometers (km) of a hospital and that overlaps with a residential area. Accordingly, $Q=R_1 \ P_1 \ R_2$ and $R_1 \ P_2 \ R_3$, wherein $R_1$=establishments, $R_2$=a hospital, $R_3$=a residential area, $P_1$=a geographic range, and $P_2$=an overlap. In this example, the spatial predicates include $P_1$=Range($R_1$, $R_2$, 7 km) and $P_2$=Overlap($R_1$, $R_2$).

A query such as the one in the above example is a conjunction of spatial predicates on relations. As used herein, a relation contains one or more spatial objects. In at least one embodiment of the invention, a query can also include non-spatial predicates. Spatial joins include joining data that satisfy spatial predicates (and can be computationally intensive). As noted herein, processing of spatial joins becomes more challenging for large amounts of data.

Accordingly, at least one embodiment of the invention includes processing multi-way spatial joins on a MapReduce platform using predicates of overlap, range and nearest neighbor. Such techniques further include partitioning the spatial data and using the partitions in MapReduce functions. Spatial operators such as described herein can be used to write spatial queries. By way of example, a spatial query might include overlaps($r_1$, $r_2$), indicating that $r_1$ overlapping with $r_2$ is a true statement. Special cases in connection with such a query might include $r_1$ touching or equaling $r_2$. An overlap to predicate subsumes the special cases. Hence, if $r_1$ touches $r_2$ or $r_1$ equals $r_2$, it is implied that $r_1$ overlaps $r_2$.

Another example spatial query can include range($r_1$, $r_2$, d), wherein the query is deemed true if any point in $r_1$ is within distance d of any point in $r_2$. Additionally, for example, a spatial query can include NearestNeighbor($r_1$, $r_2$), wherein the query is deemed true if $r_2$ is nearest to $r_1$. Specifically, $r_1$ and $r_2$ are spatial objects belonging to relations $R_1$ and $R_2$, respectively. NearestNeighbor($r_1$, $r_2$) is deemed true if object $r_2$ is nearer to object $r_1$ than any other object $r_2'$ in relation $R_2$.

At least one embodiment of the invention can include bounding shapes, such as rectangles, used in representing objects. It is to be appreciated that bounding rectangles are used herein as merely an example, and that one or more various bounding shapes can be used in accordance with one or more embodiments of the invention. Such an example embodiment utilizing bounding rectangles can additionally include initially checking and/or processing the predicate on the rectangles, and if matches exist with the rectangles, then checking and/or processing can be carried out for the corresponding actual objects. Also, at least one embodiment of the invention includes distributing records based on map and reduce functions such that predicates on bounding areas are true. If predicates are not true for the objects, those predicates will not be true for the corresponding bounding rectangles.

Accordingly, in the example embodiment noted above, there are relations $R_1$, $R_2$ and so on, which are tables. These tables include records having one or more fields. One of these fields includes the geometry of the spatial object that the record represents. This field may include the actual geometry or the bounding box/rectangle of the spatial object. This field is hence referred to as the spatial attribute of the object. There can also be other attributes in the records which are non-spatial in nature. For example, a relation $R_1$ can include a table identified as "FORESTS" which includes identification of all forests in a location (for example, the US). This table (or relation) may have multiple records, each representing a distinct forest in the US. Each record can have one attribute referred to as geometry, which shows the actual geometry of that forest or a bounding box/rectangle of that forest. Additionally, the record may also include other attributes such as the name of the forest, the area of the forest, etc.

Objectives of one or more embodiments of the invention include causing tuples that agree on a join to reside on the same reducer, and to achieve load balancing for multiple reducers. Accordingly, at least one embodiment of the invention includes partitioning a space (that is, a spatial data domain) using the x-range and/or the y-range as disjointed rectangles referred to herein as partition cells. Additionally, these partition cells can be further partitioned using a partition strategy. The partition strategy can be chosen by creating and maintaining statistics of the data by traversing the data entirely or by randomly sampling the data. By way of example, the partition cells can be further partitioned uniformly in the x-dimension and/or the y-dimension. Such a strategy works well, for instance, if spatial objects are distributed uniformly in the data.

At least one embodiment of the invention can also include creating partition cells based on the distribution of relations in the data. This is carried out, for example, using pre-processing such as selecting bins in the x-dimension and/or the y-dimension, wherein the bins are of size g. Additionally, such an embodiment includes determining the frequency of the number of objects starting in each cell of size $g^2$, and merging cells such that each resulting partition cell has an equal number of objects. The frequency determination and merging steps can be carried out, for example, using cumulative frequency and the number of desired reducers. In at least one embodiment of the invention, the processing is carried out on a cluster of machines. In such an embodiment, the number of reducers is decided by the strength and/or size of the cluster of machines available and whether each partition of the data can fit into the memory of a single reducer.

Additionally, at least one embodiment of the invention can include defining operations including project, split and replicate, as further detailed below. By way of example, assume u is a bounding rectangle and C=a set of partition cells. As such, a project operation determines the partition cell in which the start point of bounding rectangle u resides. An example project operation might include project(u, C), which outputs {key=a partition cell, and the value=u}.

Here, it is assumed that the record is represented by the bounding box/rectangle attribute therein. In this example, it is u. When processing on MapReduce, there are two steps involved: map and reduce. Operations including project, split and replicate are implemented via the map step. The map step operates on an individual record. When all of the map jobs are done executing, each such job has marked records to be sent to some particular reducer. Each reducer then receives all of the records that the map jobs have sent, and the reducer processes those records. Similar to the project operation, split and replicate are also executed by the map step, but with the difference that split and reduce may send the same record to multiple reducers, not just one reducer as in the case of the project operation.

A split operation determines all cells with at least one point in common with bounding rectangle u. An example split operation might include split(u, C), which outputs a set of key, value pairs such as {key=a partition cell/reducer, the value=u}, wherein u is sent to all reducers whose partition cell contains some part of u.

Further, a replicate (or replication) operation returns all partition cells that satisfy a certain condition (f). Condition (f) is used for efficiency purposes. A replicate operation can include, for example, replicating the bounding rectangle to all reducers that lie to the right and below the rectangle u. Condition (f) determines the extent of replication to be carried out to prevent unnecessary replication. For instance, an example replicate operation might include replicate(u, C, f), which outputs {key=a partition cell, value=u} such that every partition cell and u satisfies f. The project, split and replicate operations can be carried out on relations $R_1, R_2, \ldots$, wherein the operations are carried out for each tuple in R.

By way of illustration of one or more embodiments of the invention, let the number of reducers be k. Here, k is decided based on the relations' sizes and whether a single partition can fit entirely within the main memory of a single reducer. Accordingly, an example embodiment of the invention can include dividing the data space into a grid with k partition cells. Further, for a given query with relations contained therein, a project, split and/or replicate operation can be selected and performed on the relations as a map function.

The intermediate result of the selected operation(s) with the same key is routed to a single reducer. Accordingly, the keys with the same partition cell are routed to the same reducer. The MapReduce framework includes a mechanism to identify reducers with cardinal numbers. The keys lie in this range. By way of example, if the number of reducers is ten, the keys can range from zero to nine. Accordingly, the key determines the reducer. Additionally, if two tuples agree on a predicate, those tuples are to be present on the same reducer. Also, at least one embodiment of the invention can include validating the relations agreement. As noted herein, the map operations (project, split and replicate) ensure that the tuples which satisfy a certain predicate are present together for at least one reducer.

Further, as a result of the selected operation(s), a spatial join is output as part of the noted reducer. Additionally, at least one embodiment of the invention includes compiling a union of the outputs from all of the reducers to generate a composite output. Each individual reducer outputs the result of processing the tuples assigned thereto. This output is stored on the distributed file system (DFS) in a file specific to this reducer. The combination of the files of all reducers provides the composite output for the join query.

By way of further illustration, consider the following example embodiment of the invention implementing an "overlap" spatial predicate. Let $R_1$ and $R_2$ be two relations to be joined based on an overlap spatial predicate. Also, let $r_1$ be a rectangle in $R_1$ and $r_2$ be a rectangle in $R_2$ that satisfy the overlap predicate. Accordingly, the example embodiment includes splitting $r_1$ and $r_2$ in the mapper. As used herein, the mapper is an abstract entity representing the task that the map jobs are intended to carry out. The phrase "splitting $r_1$ and $r_2$ in the mapper," for example, indicates that the map jobs execute the operation "split" on the tuples they receive. Additionally, the reducer will find the overlap because overlaps will reach at least one reducer. Such an embodiment of the invention can also include removing duplicates, for example, by scanning the output and recording only unique results.

At least one embodiment of the invention can additionally include permitting the reducer to find the overlap only if, in the partition cell, the following is satisfied: The starting point of the intersection of $r_1$ and $r_2$ lies in the partition cell. This ensures that there is no duplicate.

Additionally, by way of illustration, consider the following example embodiment of the invention implementing a "range" spatial predicate. Let $R_1$ and $R_2$ be two relations to be joined based on spatial predicate range with parameter d. Accordingly, the example embodiment of the invention includes determining the tuples in $R_1$ and $R_2$ which satisfy the given range predicate. Let $r_1$ be a rectangle in $R_1$ and $r_2$ be a rectangle in $R_2$ that satisfy the range predicate. If $R_2$ has more tuples than $R_1$, $r_2$ is projected in the mapper; otherwise, $r_1$ is projected in the mapper. The phrase "projected in the mapper" indicates that the map jobs execute the operation "project" on the tuples they receive. Also, unless otherwise determined, assume $R_2$ has more tuples than $R_1$; if not, swap $r_1$ and $r_2$ in the subsequent steps detailed below.

Such an example embodiment of the invention also includes replicating $r_1$ with function $f$ such that $dist(c, r_1) < d$. In this case, c is the partition cell of $r_1$. Accordingly, $r_1$ will propagate to all partition cells within a distance of d to $r_1$. If $r_2$ is within that range (d), $r_1$ will be propagated to a reducer on which $r_1$ is propagated. This propagation is the result of the map operations of project, split or replicate, as previously described herein. Note that such action does not produce duplicates. Also, because a project operation produces fewer numbers of tuples than a replicate operation, it can be advantageous to project a relation with a greater number of tuples. However, at least one embodiment of the invention can be executed even if a relation with a lesser number of tuples is projected. In such an instance, $R_2$ can be chosen (as noted above).

At least one embodiment of the invention includes the use of a multi-way join. Consider, for example, a join query that states: $R_1$ overlaps $R_2$, and $R_2$ overlaps $R_3$. Such an embodiment of the invention can include joining $R_1$ with $R_2$ and obtained results $O_1$, as well as joining $O_1$ with $R_2$. This sequence can be repeated for additional predicates in a serial manner. Additionally, $O_1$ is the result of the join query: "$R_1$ overlaps $R_2$." Also, the result of "$R_1$ overlaps $R_2$," that is, $O_1$, must contain the rectangles of both $R_1$ and $R_2$. Because the multi-way join query includes "$R_2$ overlaps $R_3$," the relation $O_1$ is joined with $R_3$ using the rectangles of $R_2$ and $R_3$, where the rectangles in $R_2$ come from $O_1$.

An example embodiment of the invention utilizing a multi-way join can also include the following. Consider a join query that states: $R_1$ overlaps $R_2$, and $R_2$ overlaps $R_3$. Such an embodiment of the invention can include replicating all relations with a suitable function $f$. For one-dimensional (1D) partitions, the rectangle can be replicated to all partition cells right of a given bounding rectangle. For two-dimensional (2D) partitions, the rectangle can be replicated to all partition cells right of and below the rectangle. 1D partitions are intervals. For instance, $\{[1-5],[6-10],[11-15],[16-20]\}$ is an example of four partitions of the 1D range 1-20. An example of 2D partition might include partitioning a rectangle (1, 1, 20, 20) into four distinct rectangles as: $\{[1, 1, 10, 10], [1, 11, 10, 2], [11, 1, 20, 10], [11, 11, 20, 20]\}$.

Additionally, for 1D partitions, the reducer corresponding to the partition cell of the rightmost rectangle computes the join. This avoids duplicate processing. Also, for 2D partitions, the partition cell containing the largest starting x-coordinate and the largest starting y-coordinate computes the join (assuming that the origin is at the top left corner). The join computation noted here is for multi-way joins, and is used so that there are no duplicates present in the final output.

An additional example embodiment of the invention includes utilizing a multi-way join can also include the following. Consider a join query that states: $R_1$ range($d_1$) $R_2$, and $R_2$ range($d_2$) $R_3$. Such an embodiment of the invention can include computing the distance metric D to estimate the amount of replication to different cells. This can be carried out, for example, via the use of a join graph. Additionally, such an embodiment of the invention can also include determining and/or identifying a relation to project. Such a determination can be made, for example, by use of a join graph where the nodes are the relations and the edges are the predicates. The weights of the edges are proportional to the range parameter d. Further, for rectangle r in R, such an embodiment includes communicating the rectangle to all partition cells within a distance D(R, c) from r.

At least one embodiment of the invention can also include implementing a controlled replication operation. Such an embodiment includes selectively replicating rectangles, which, for example, can include removing the rectangles that need not be replicated from the set of rectangles. Further, the rectangles which will not be present in the output can be identified, or the output tuple can be computed at the reducer itself. To identify these rectangles, at least one embodiment of the invention includes following an algorithm that examines the rectangles in a partition cell and discovers the rectangles which either do not belong to any output tuple formed entirely within the partition cell, or belong to any partial result with at least one rectangle crossing over to other partition cells.

Consider the following example query: $R_1$ overlaps $R_2$, $R_2$ overlaps $R_3$, and $R_3$ overlaps $R_4$. In such an example, rectangles $u_1$, $v_1$ need not be replicated and do not overlap with any other rectangle. Further, rectangle $v_2$ need not be replicated as it does not overlap with any rectangle from $R_1$.

Figure 1:
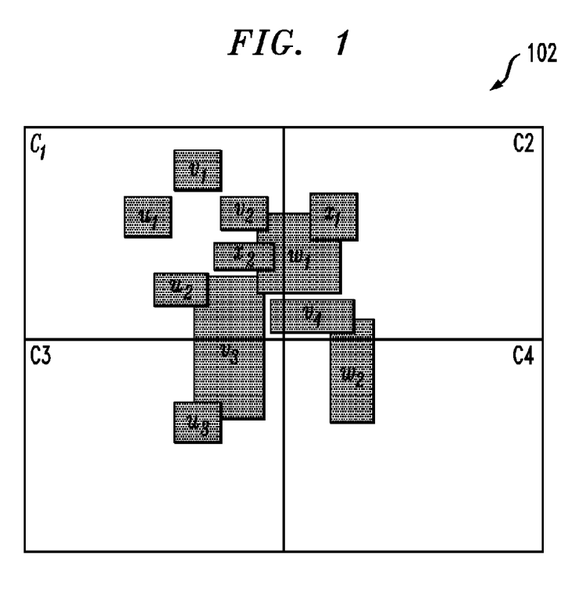
FIG. 1 is a diagram illustrating an example embodiment, according to an aspect of the invention.

FIG. 1 is a diagram illustrating an exemplary graphical representation 102, according to an aspect of the invention. By way of example, let $R_1$, $R_2$, $R_3$ and $R_4$ be the tables being joined on the spatial attribute, and let u, v, w and x represent the records in these relations, respectively. Note that rectangles $u_2$, $v_3$, $w_1$ and $x_1$ form an output record for the join query $R_1$ overlaps $R_2$ and $R_2$ overlaps $R_3$ and $R_3$ overlaps $R_4$. However, it is not apparent to the reducer, represented by $C_1$, because the reducer cannot see $x_1$. In such a case, the reducer knows that $w_1$ may have a relation with some record in relation $R_4$ because $w_1$ crosses the boundary of reducer $C_1$. Hence, it is necessary that the rectangles in this partial set $u_2$, $v_3$ and $w_1$ be replicated. A similar operation is carried out with other partial sets as well in order to obtain all of the joining rectangles at some common reducer and perform the join. However, note that $u_1$ need not be replicated because it does not join with any rectangle which is required by the query, and hence, is not replicated.

Additionally, at least one embodiment of the invention can include implementing a controlled replication operation within a limit. In such an embodiment, a rectangle is not replicated to all partition cells; rather, a rectangle may only be replicated to a defined limit. The limit is determined using the join query and determining the maximum distance to which a rectangle must be replicated to ensure a correct and complete output. One such method includes using a join graph (such as previously described herein) and summing the distances d in all of the range predicates and the maximum diagonal sizes of all of the relations to obtain the limit.

Figure 2:
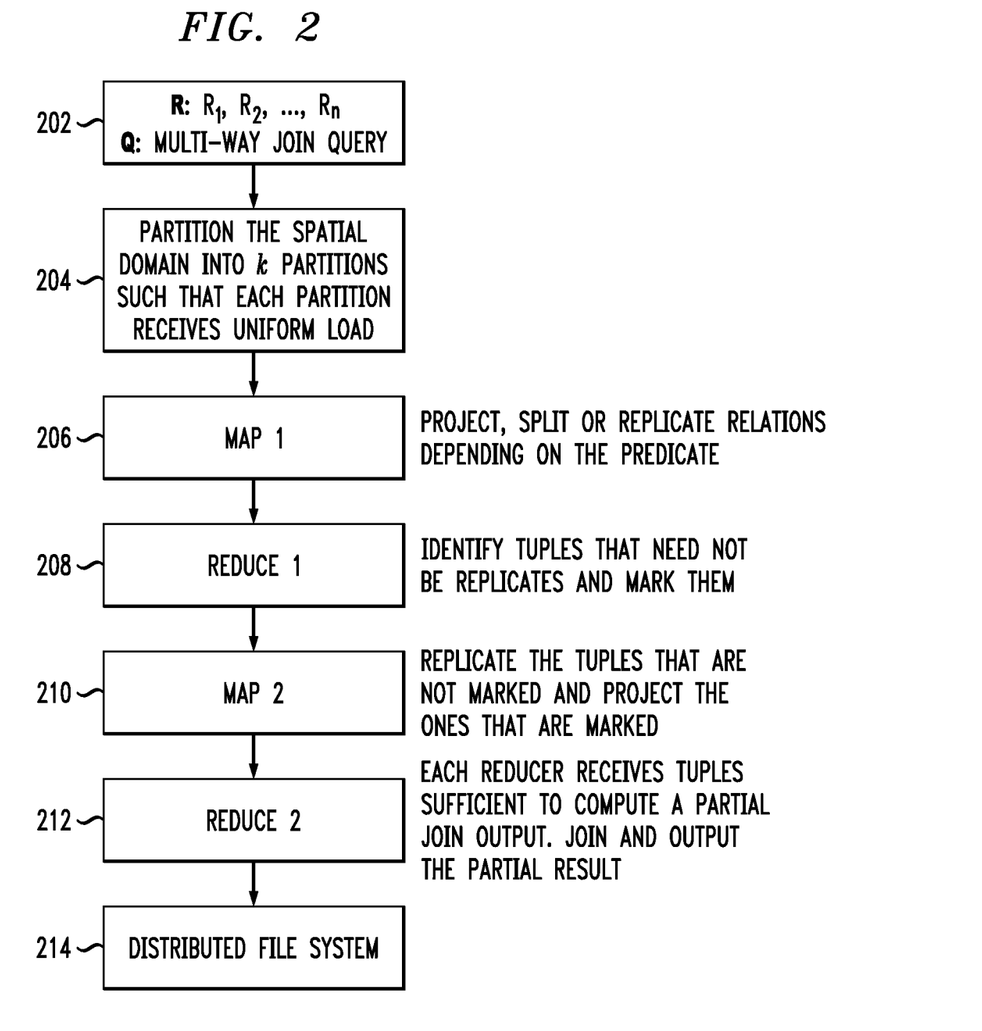
FIG. 2 is a block diagram illustrating an example embodiment, according to an aspect of the invention.

FIG. 2 is a block diagram illustrating an example embodiment, according to an aspect of the invention. As depicted in FIG. 2, the input 202 to the system is R, the set of relations to be joined, and Q, the multi-way join query. In step 204, the input relations are scanned and/or sampled to identify the spatial distribution of data objects in the relations and a partition is obtained which ensures an approximately uniform load across all of the partitions. The partitioning is used in a map function in step 206 to communicate rectangles (or other bounding shapes) to different reducers using the operators project, split and replicate. In the reduce step of the first cycle illustrated in step 208, the rectangles which need not be replicated are marked and passed to the second cycle of map reduce.

In the map step of the second cycle illustrated in step 210, the marked rectangles are projected while the unmarked rectangles are replicated. In the reduce step of the second cycle illustrated in step 212, each reducer includes all of the tuples to compute the final partial output of the join query. Each reducer computes the partial output and outputs the partial output to the distributed file system 214. The files are subsequently collated together to form the final join output.

Figure 3:
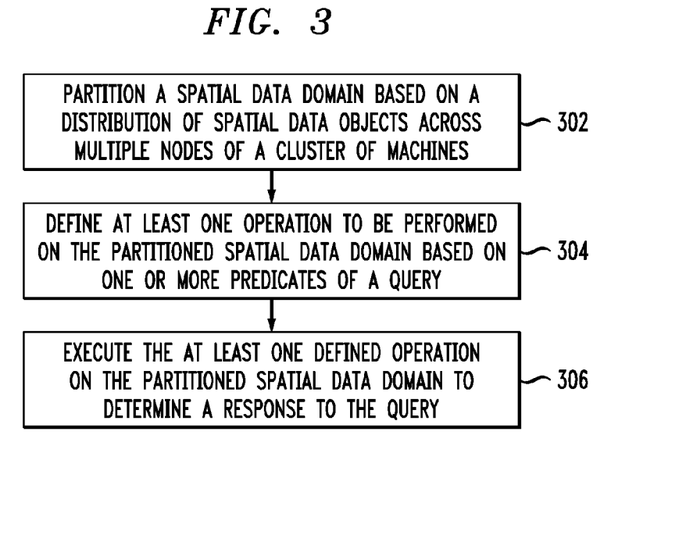
FIG. 3 is a flow diagram illustrating techniques according to an embodiment of the invention.

FIG. 3 is a flow diagram illustrating techniques according to an embodiment of the present invention. Step 302 includes partitioning a spatial data domain based on a distribution of spatial data objects across multiple nodes of a cluster of machines. This partitioning step can include partitioning the spatial data domain in the x-dimension and/or the y-dimension of the spatial data domain, as well as partitioning in accordance with a partition strategy.

Additionally, partitioning can include configuring containers in the x-dimension and/or the y-dimension of the spatial data domain, wherein each container is a uniform size. Also, at least one embodiment of the invention includes determining the number of spatial data objects starting in each container, and merging one or more partitions in the spatial data domain such that each resulting partition has an equal number of spatial data objects.

Step 304 includes defining at least one operation to be performed on the partitioned spatial data domain based on one or more predicates of a query (for example, a query provided by a user). As detailed herein, the predicates can include at least one of an overlap parameter ("overlap with"), a range parameter ("within a range of"), and a nearest neighbor parameter. Additionally, as also noted herein, an operation can include a project operation, wherein said project operation determines a partition in which the start point of a spatial data object resides. Another operation includes a split operation, wherein said split operation determines all partitions that share at least one point of a spatial data object. Yet another operation includes a replication operation, wherein said replication operation determines all partitions that satisfy a given condition.

Step 306 includes executing the at least one defined operation on the partitioned spatial data domain to determine a response to the query. Additionally, at least one embodiment of the invention includes compiling two or more spatial joins on the spatial data domain determined in response to the query to generate a composite output.

The techniques depicted in FIG. 3 can also include defining the distribution of spatial data objects across multiple nodes of the cluster of machines, wherein the defining can be carried out to balance said distribution of spatial data objects across the multiple nodes of the cluster of machines.

Figure 4:
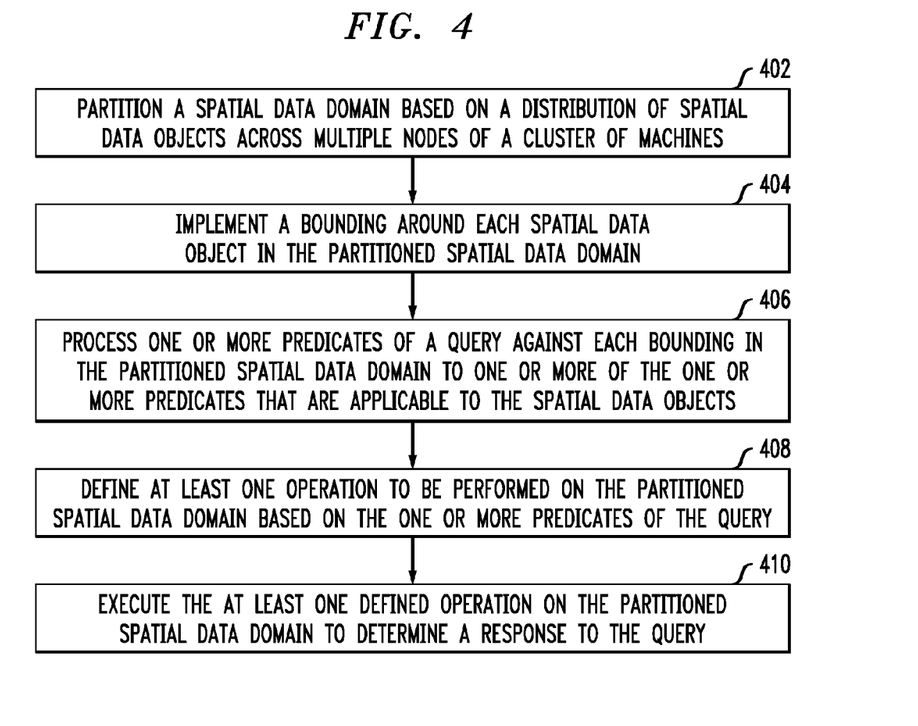
FIG. 4 is a flow diagram illustrating techniques according to an embodiment of the invention.

FIG. 4 is a flow diagram illustrating techniques according to an embodiment of the invention. Step 402 includes partitioning a spatial data domain based on a distribution of spatial data objects across multiple nodes of a cluster of machines. Step 404 includes implementing a bounding (for example, a rectangle) around each spatial data object in the partitioned spatial data domain. Step 406 includes processing one or more predicates of a query against each bounding in the partitioned spatial data domain to one or more of the one or more predicates that are applicable to the spatial data objects.

Step 408 includes defining at least one operation to be performed on the partitioned spatial data domain based on the one or more predicates of the query. Step 410 includes executing the at least one defined operation on the partitioned spatial data domain to determine a response to the query.

The techniques depicted in FIG. 3 and FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 and FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
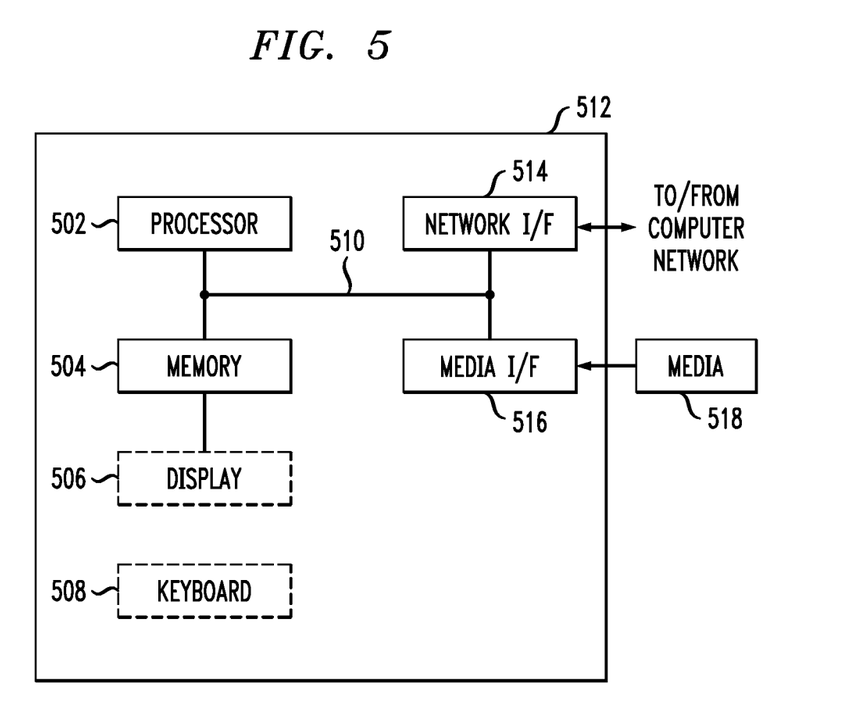
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, to component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, distributing spatial objects across multiple reducers to minimize cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    partitioning a spatial data domain into multiple portions of partitioned spatial data via a MapReduce framework based on a distribution of spatial data objects across multiple nodes of a cluster of machines;
    defining at least one operation to be performed on each of the multiple portions of the partitioned spatial data domain based on one or more spatial predicates of a query, wherein:
        said at least one operation is selected from a group consisting of (i) a project operation that determines a partition in which the start point of a given spatial data object resides, (ii) a split operation that determines all partitions that share at least one point of a given spatial data object, and (iii) a replication operation that determines all partitions that satisfy a given condition; and
        said one or more spatial predicates are selected from a group consisting of (i) an overlap parameter that indicates that two or more portions of the spatial data each possess at least one identical value, (ii) a range parameter that indicates that any point in a first portion of the spatial data is within a given distance of any point in a second portion of the spatial data, and (iii) a nearest neighbor parameter that indicates that a first portion of the spatial data is nearer to a second portion of the spatial data than any other portion of the spatial data; and
    executing the at least one defined operation on each of the multiple portions of the partitioned spatial data domain to determine a response to the query, wherein each of the multiple portions of the partitioned spatial data is processed exclusively by a distinct map task within the MapReduce framework;

wherein said partitioning, said defining, and said executing are carried out by a computer device.

2. The method of claim 1, comprising:
defining the distribution of spatial data objects across multiple nodes of the cluster of machines.

3. The method of claim 2, wherein said defining comprises defining the distribution of spatial data objects such that said distribution of spatial data objects across the multiple nodes of the cluster of machines is balanced.

4. The method of claim 1, wherein said partitioning comprises partitioning the spatial data domain in the x-dimension and/or the y-dimension of the spatial data domain.

5. The method of claim 1, wherein said partitioning comprises partitioning in accordance with a partition strategy.

6. The method of claim 1, wherein said partitioning comprises configuring multiple containers in the x-dimension and/or the y-dimension of the spatial data domain, wherein each of the multiple containers has a uniform size.

7. The method of claim 6, comprising:
determining the number of spatial data objects starting in each of the multiple containers; and
merging one or more partitions in the spatial data domain such that each resulting partition has an equal number of spatial data objects.

8. The method of claim 1, comprising:
compiling two or more spatial joins on the spatial data domain determined in response to the query to generate a composite output.

9. An article of manufacture comprising a computer readable storage medium having computer readable instructions tangibly embodied thereon which, when implemented, cause a computer to carry out a plurality of method steps comprising:
partitioning a spatial data domain into multiple portions of partitioned spatial data via a MapReduce framework based on a distribution of spatial data objects across multiple nodes of a cluster of machines;
defining at least one operation to be performed on each of the multiple portions of the partitioned spatial data domain based on one or more spatial predicates of a query, wherein:
said at least one operation is selected from a group consisting of (i) a project operation that determines a partition in which the start point of a given spatial data object resides, (ii) a split operation that determines all partitions that share at least one point of a given spatial data object, and (iii) a replication operation that determines all partitions that satisfy a given condition; and
said one or more spatial predicates are selected from a group consisting of (i) an overlap parameter that indicates that two or more portions of the spatial data each possess at least one identical value, (ii) a range parameter that indicates that any point in a first portion of the spatial data is within a given distance of any point in a second portion of the spatial data, and (iii) a nearest neighbor parameter that indicates that a first portion of the spatial data is nearer to a second portion of the spatial data than any other portion of the spatial data; and
executing the at least one defined operation on each of the multiple portions of the partitioned spatial data domain to determine a response to the query, wherein each of the multiple portions of the partitioned spatial data is processed exclusively by a distinct map task within the MapReduce framework.

10. The article of manufacture of claim 9, wherein the method steps comprise:
compiling two or more spatial joins on the spatial data domain determined in response to the query to generate a composite output.

11. A system comprising:
a memory; and
at least one processor coupled to the memory and operative for:
partitioning a spatial data domain into multiple portions of partitioned spatial data via a MapReduce framework based on a distribution of spatial data objects across multiple nodes of a cluster of machines;
defining at least one operation to be performed on each of the multiple portions of the partitioned spatial data domain based on one or more spatial predicates of a query, wherein:
said at least one operation is selected from a group consisting of (i) a project operation that determines a partition in which the start point of a given spatial data object resides, (ii) a split operation that determines all partitions that share at least one point of a given spatial data object, and (iii) a replication operation that determines all partitions that satisfy a given condition; and
said one or more spatial predicates are selected from a group consisting of (i) an overlap parameter that indicates that two or more portions of the spatial data each possess at least one identical value, (ii) a range parameter that indicates that any point in a first portion of the spatial data is within a given distance of any point in a second portion of the spatial data, and (iii) a nearest neighbor parameter that indicates that a first portion of the spatial data is nearer to a second portion of the spatial data than any other portion of the spatial data; and
executing the at least one defined operation on each of the multiple portions of the partitioned spatial data domain to determine a response to the query, wherein each of the multiple portions of the partitioned spatial data is processed exclusively by a distinct map task within the MapReduce framework.

12. A method comprising:
partitioning a spatial data domain into multiple portions of partitioned spatial data via a MapReduce framework based on a distribution of spatial data objects across multiple nodes of a cluster of machines;
implementing a bounding around each spatial data object in the partitioned spatial data domain;
processing one or more spatial predicates of a query against each bounding in the partitioned spatial data domain to one or more of the one or more spatial predicates that are applicable to the spatial data objects;
defining at least one operation to be performed on each of the multiple portions of the partitioned spatial data domain based on one or more spatial predicates of a query, wherein:
said at least one operation is selected from a group consisting of (i) a project operation that determines a partition in which the start point of a given spatial data object resides, (ii) a split operation that determines all partitions that share at least one point of a given spatial data object, and (iii) a replication operation that determines all partitions that satisfy a given condition; and
said one or more spatial predicates are selected from a group consisting of (i) an overlap parameter that indicates that two or more portions of the spatial data each possess at least one identical value, (ii) a range parameter that indicates that any point in a first portion of the spatial data is within a given distance of any point in a second portion of the spatial data, and (iii) a nearest neighbor parameter that indicates that a first portion of the spatial data is nearer to a second portion of the spatial data than any other portion of the spatial data executing the at least one defined operation on each of the multiple portions of the partitioned spatial data domain to determine a response to the query, wherein each of the multiple portions of the partitioned spatial data is processed exclusively by a distinct map task within the MapReduce framework;

wherein said partitioning, said implementing, said processing, said defining, and said executing are carried out by a computer device.

\* \* \* \* \*